United States Patent [19]

Kiss

[11] 4,104,168

[45] Aug. 1, 1978

[54] SLUDGE SETTLING AND DE-WATERING APPARATUS

[76] Inventor: Sandor G. Kiss, 236 E. Sunset Ave., Lombard, Ill. 60148

[21] Appl. No.: 603,004

[22] Filed: Aug. 8, 1975

[51] Int. Cl.² .................................................. B01D 21/24
[52] U.S. Cl. ................................... 210/297; 210/306; 210/319; 210/526
[58] Field of Search ............... 210/305, 306, 319, 523, 210/526, 525, 540, DIG. 18, 297; 209/45, 46, 256, 258, 492–495; 222/264, 273, 274, 275, 281, 342, 344, 415; 251/126, 310; 133/242–244

[56] References Cited

U.S. PATENT DOCUMENTS

| | | | |
|---|---|---|---|
| 409,186 | 8/1889 | Friend | 209/46 |
| 476,710 | 6/1892 | Wherry | 209/45 X |
| 958,068 | 5/1910 | Arbuckle | 210/523 X |
| 1,105,912 | 8/1914 | Kirby | 209/494 X |
| 1,411,483 | 4/1922 | Floyd | 137/242 X |
| 1,648,607 | 11/1927 | Brown | 210/525 X |
| 2,103,796 | 12/1937 | Seip | 210/525 X |
| 2,242,652 | 5/1941 | Maxwell | 210/319 X |
| 2,554,637 | 5/1951 | Rerick | 222/281 X |
| 3,666,108 | 5/1972 | Veld | 210/305 |
| 3,810,549 | 5/1974 | Kiss | 210/319 X |

*Primary Examiner*—John Adee

[57] ABSTRACT

Sludge settling and de-watering apparatus including a heavy solid settling compartment, a lighter than water solid accumulation compartment each including vibrator means, each compartment has a separate outlet for the solids accumulated therein and each outlet includes power operated valve means to control the discharge of solids from the respective compartments. Separate discharge means is provided for the residue water.

8 Claims, 5 Drawing Figures

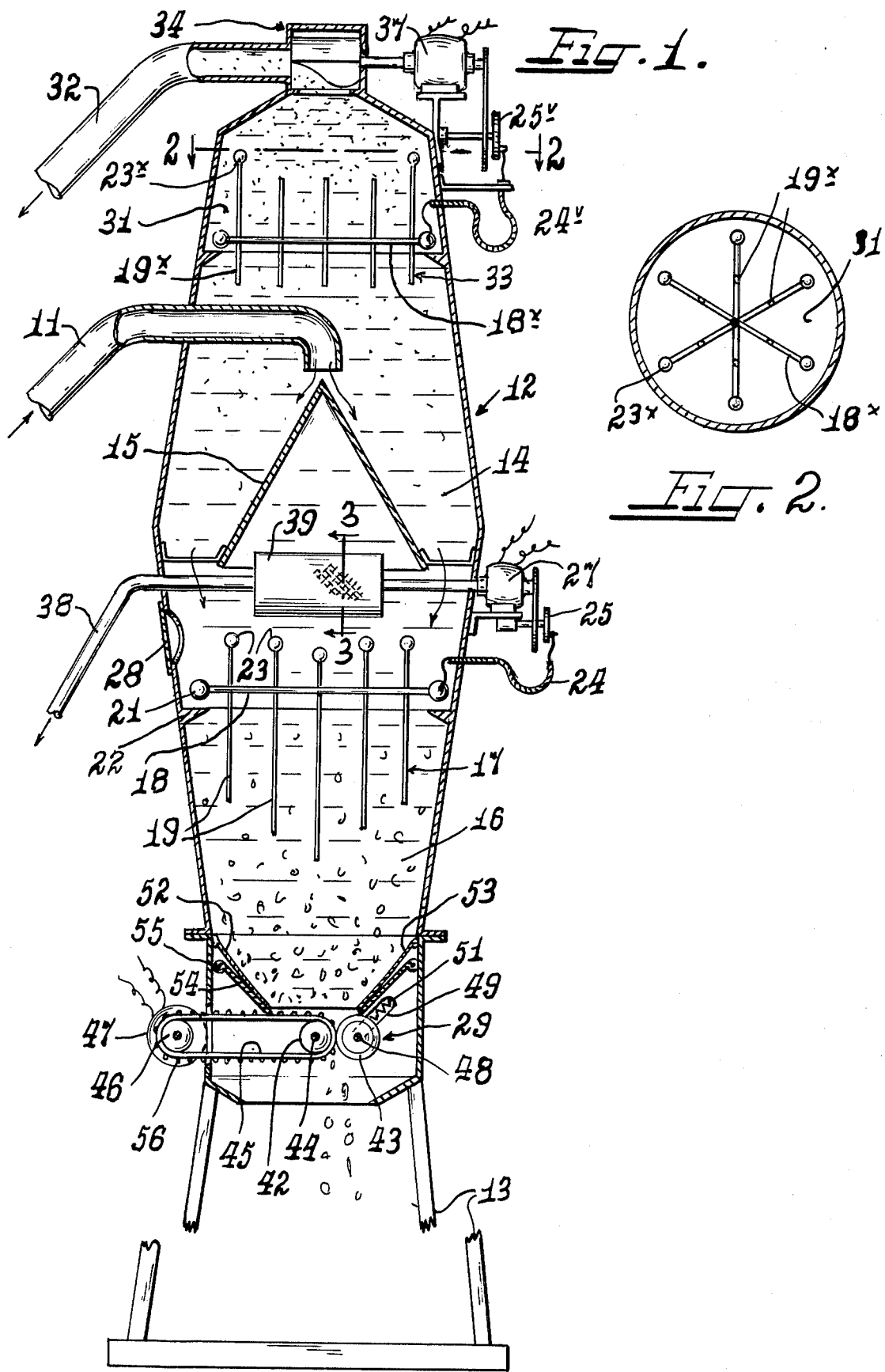

SLUDGE SETTLING AND DE-WATERING APPARATUS

The invention relates to improvements in sludge settling and de-watering apparatus or sludge consolidator means including means to remove oil, fat solids and other lighter than water substances as well as heavier than water substance from residue water and to means to control the separate discharge of such substances. Further the structure includes controlled outlets for the fat and solid substances so as to maintain the system pressurized.

This invention constitutes an improvement over the apparatus shown and claimed in my U.S. Pat. No. 3,810,549, issued May 14, 1974, and distinguishes over the disclosure in Walter U.S. Pat. No. 2,281,609, issued May 5, 1942.

The apparatus is particularly useful in instances where the deposit of heavy solids is to be transported away from the site of collection, although it is useful for on-site discharge. Sludge is processed by novel vibratory means aided by gravity that is effective to insure that all substances heavyer than water are carried by gravity to the bottom of the water mass for discharge.

More particularily, dredging sludge is conveyed under pressure through a conduit into the unit wherein the heavy solid particles settle at the bottom of the unit and are discharged through a driven discharge valve from the bottom thereof. In addition, to processing sludge from a dredging operation, the unit is useful in such industries as, but not limited to, the steel industry and food packing industry. Water waste as well as that contained in sludge, and recovered from these industries, frequently contains oil and fat particules and other substances that are lighter than water. Fat and oil solids which are suspended in the water entering the unit are caused to rise to the top of the unit and are carried off through valved discharge means; while the clear water remaining is filtered and then discharged at a level above the sludge level into a sewer or perhaps back into an external body of water for reuse.

Generally, the sludge consolidator includes a vertically arranged cylinder or tank which, for purposes of explanation may be said to comprise three divisions or compartments which are arranged one above the other. In operation, sludge is collected in and clear water is discharged from a middle compartment; whereas heavy solids settling out of the water are collected in a bottom compartment and discharged from said compartment after any remaining water is separated therefrom. The upper compartment collects suspended substances that are lighter than water and discharges same through a valved outlet at the upper end of the cylinder or tank.

It is therefore an object of this invention to provide a sludge consolidator of the character referred to.

Another object is to provide novel means to insure separation of lighter than water substances from water passing through the apparatus.

Another object is to provide a novel filter and filter cleaning means for use in a sludge consolidator.

Another object is to provide novel resilient valve means in a sludge consolidator to remove any water in the settled solids prior to discharge of said solids.

Another object is to provide novel means to direct the flow of heavy solids to the valved outlet for the separation of water therefrom prior to discharge of the solids.

Another object is to provide novel valve means at the entrance to the oil and fat particle discharge.

Other objects and advantages of the invention will become apparent with reference to the following description and accompanying drawings.

IN THE DRAWINGS:

FIG. 1 is a vertical central sectional view of the sludge consolidator, showing parts in elevation.

FIG. 2 is a detail plan view of the agitator.

Figure 3:
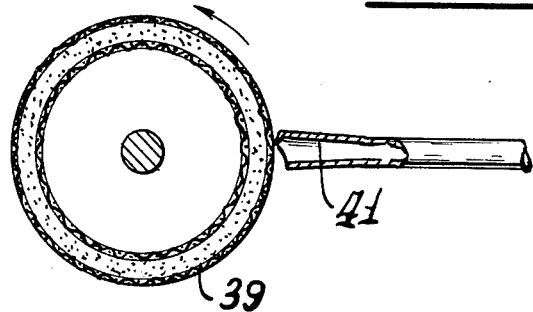
FIG. 3 is a detail view of the screen and particle removing means associated with it.

Referring to the exemplary illustration of the sludge consolidator best shown in FIG. 1, of the accompanying drawings, the system includes a flow inlet line 11 leading from a body of water for conveying sludge or other water entrained residue to substantially the center area of the sludge consolidator cylinder or tank indicated as a whole at 12.

The sludge consolidator tank 12 is operationally vertically divided into a plurality of compartments each functioning to contain the water entrained residue in various stages of solid separation. Preferably, the consolidator 12 is mounted on pillars 13 which support it at a considerable distance from its support surface so as to permit a truck, railroad car or other container to be located beneath its heavy solid discharge.

Sludge, or water entrained slurry or other fluid-solid mixture, entering through inlet line 11 under pressure, is delivered into a medial compartment 14 downwardly onto an inverted connical distributor 15. Heavy solids in the water-slurry decend into and settle in a lower compartment 16 where it is agitated by a vibrator 17 arranged in said lower compartment. The vibrator assists to settle the solids and to break water loose from the solid particles as well as unite homogeneous submicron size particles and break loose fats, oils and other lighter than water particles so that they can rise to the top of the water.

Although other types of vibrators may function satisfactory, it is preferred that the vibrator by comprised of a series of substantially horizontally disposed rods 18 to which is secured, as by welding, a plurality of vertical rods 19. The vertical rods are spaced from one another as shown, and preferably are of various effective lengths arranged with the inner or centrally located rods shorter at the upper ends and longer at their lower ends than the next adjacent rods as the outside diameter of the vibrator is approached.

The horizontal rods 18 preferably have resilient bumpers 21 on their ends which normally (when at rest) seat upon an internal shoulder 22 in the tank wall to limit their movement downwardly. The top ends of the outermost vertical rods 19 also have bumpers 23 which cushion the vibrator should it be carried into an extreme upper position. Agitation of the vibrator is accomplished by means of a bowden type cable 24 that extends to the outside of the tank and has the other end of its inner wire connected to an eccentric 25 which is rotatably driven, through a belt drive, by a motor 27. In operation, as the wire of the bowden cable is reciprocated, the vibrator 17, which is free-floating, will vibrate horizontally and vertically, the latter depending upon the resistance offered by sludge solids being thereby accumulated in the lower compartment of the tank.

Preferably, a viewing window 28 is provided in the wall of lower compartment 16 to enable the operator to determine when the level of solids has reached a predetermined height to warrant operation to control means for a discharge valve assembly 29 to be described in detail presently.

Any lighter than water solids such as fat or oil particles entrained in the water contained in the tank rise, because of their light weight, to the very top of the water mass and are accumulated in an upper compartment 31 from where it is periodically carried off through a discharge conduit 32. This separation of fat and oil and other lighter than water substances is aided by a vibrator 33 constructed in substantially the same manner as the bottom compartment vibrator 17 and shown bearing the same part numbers with the suffix "x". The separated substances are discharged through the conduit 32 into any suitable container, Not shown.

Figure 4:
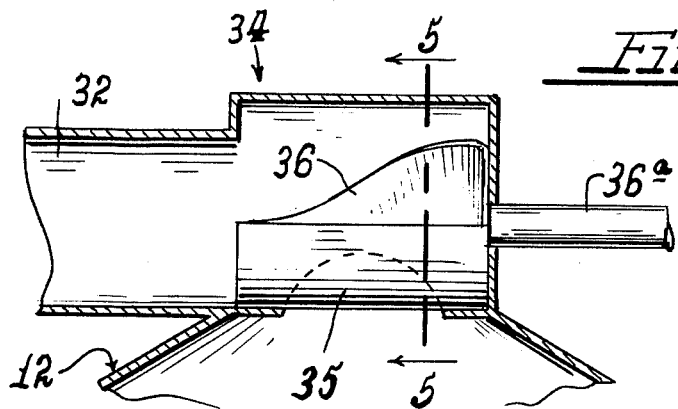
FIG. 4 is an enlarged detail view of the valved outlet for fat and oil substances.
Figure 5:
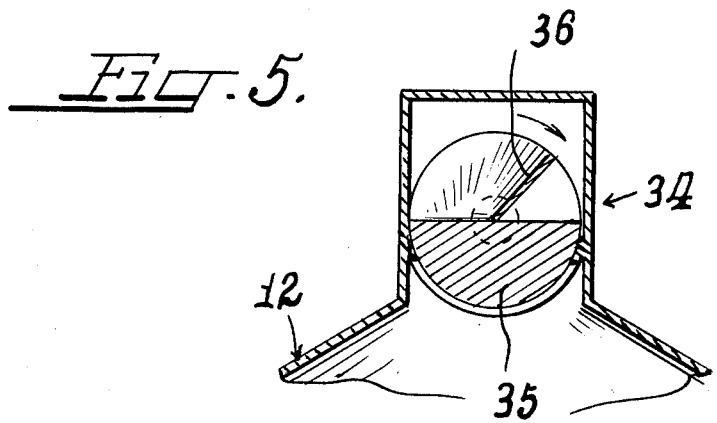
FIG. 5 is a transverse sectional view of the valved outlet taken substantially on line 5—5 of FIG. 4.

Because it is most desirable to maintain the liquid in tank 12 under pressure, the tank outlet leading to discharge conduit 32 has a combination valve-auger assembly 34, best shown in FIGS. 4 and 5. This assembly is comprised of a semi-cylindrical body 35 carried by an axel 36$^a$ and located in the conduit 32 above its inlet from the upper compartment. The body 35 has an auger or angular blade 36 integral with its flat face. A motor 37 connected to shaft 36$^a$ outside the conduit may be automatically controlled by a suitable pressure actuated switch (not shown) or a manually actuated switch so as to be periodically operated to rotate the valve body 35 to let lighter than water particles escape into the conduit and be urged therealong by the auger blade 36. When at rest, the semi-cylindrical body will block the outlet to the conduit. The vibrator 33 is driven by the motor 37, the connection being like that previously described and the parts of which are identified by the same numerals having a suffix "v".

The clean or substantially clean water remaining in the tank, and particularly in the medial compartment 14, is discharged through a conduit 38 as waste or for recycling. However, before entry into the conduit 38 the water passes through a water filter or silt retainer 39, which is driven by motor 27. Associated with the filter is a scraper and vacuum head 41 (FIG. 3) that tends to forcibly remove any small particles of waste material from the screen and deliver it to the outside of the tank.

The heavier than water solids settling in the bottom compartment 16 are supported over the discharge valve assembly 29. This assembly is comprised of a pair of rollers 42, 43, the roller 42 being journalled on a fixed axis 44. The roller 42 has a belt 45 trained thereover which is also trained over a wheel 46 arranged outside the tank assembly and driven by a motor 47. The other roller 43, which has a highly resilient surface, has its axle 48 mounted in an angularly disposed track 49. A spring 51 normally urges roller 43 into surface contact with belt 45 so as to effect a common drive for both rollers.

Heavy solids are directed into the nip of the belt-roller assembly by means of a trapezium-shaped chute 52 which forms the bottom of the lower chamber 16. This chute is fabricated from pliable material, such as plastic or tough rubber, and its sloping walls 53 are supported by rigid plates 54 that are loosely hingedly connected at 55 to the surrounding wall and have their free opposed edges seated on the respective belt and roller. In operation, the heavy solids pass between the belt 45 and roller 43 which relieve the solids of substantially all water. The solids are then discharged into a vehicle located thereunder or onto the ground. If desired, the belt 45 may be surfaced with ribs 56 to facilitate the delivery of solids into the nip between the belt and roller.

Although I have described a preferred embodiment of my invention, in considerable detail, it will be understood that the description thereof is intended to be illustrative rather than restrictive, as details of the structure may be modified or changed without departing from the spirit or scope of the invention. Accordingly, I do not desire to be restricted to the exact construction shown and desribed.

I claim:

1. A sludge consolidator comprising a vertically elongated tank, a sludge inlet located substantially midway between its ends, a disbursing element below said inlet, a water discharge line located beneath said disbursing element, a filter in the water discharge line, said filter comprising a revolvable screen and means associated with the screen to remove solid particles therefrom and discharge them outside the tank, a collection chamber for heavy solids below said filter, a vibratory means in said chamber, a valved outlet in the bottom of said chamber, said tank including a compartment above the sludge inlet in which particles of less weight than the water accumulate, vibratory means in said compartment, and discharge means in said compartment to carry the said particles away from said compartment.

2. The consolidator recited in claim 1, wherein separate means is provided to vibrate each of the vibratory means.

3. The consolidator recited in claim 1, wherein the valved outlet comprises a pair of rotary elements each having a resilient contacting surface.

4. A sludge consolidator comprising a vertically elongated tank, a sludge inlet located substantially midway between its ends, a disbursing element below said inlet, a water discharge line located beneath said disbursing element, a filter in the water discharge line, said filter comprising a revolvable screen and means associated with the screen to remove solid particles therefrom and discharge them outside the tank, a collection chamber for heavy solids below said filter, a vibratory means in said chamber, a valved outlet in the bottom of said chamber, said valved outlet including a pair of rollers arranged parallel one to the other, a belt trained over one roller, means to rotatably drive said rollers, means mounting one roller for movement toward and away from the other roller, spring means normally urging said movable roller in surface to surface contact with the belt, said belt and movable roller being resilient to yield under pressure of solids passing between them, and a trapezium-shaped hopper arranged above the nip of said rollers, said tank including a compartment above the sludge inlet in which particles of less weight than the water accumulate, and discharge means in said compartment to carry the said particles away from said compartment.

5. The consolidator recited in claim 4, wherein the filter comprises a revolvable screen and means associated with the screen to remove solid particles therefrom and discharge them outside the tank.

6. The valve structure recited in claim 4, wherein rigid plates underlie parts of the hopper to prevent its distortion under load conditions.

7. The consolidator of claim 4 wherein said hopper is comprised of flexibly pliable material.

8. A sludge consolidator comprising a vertically elongated tank, a sludge inlet located substantially midway between its ends, a disbursing element below said inlet, a water discharge line located beneath said disbursing element, a filter in the water discharge line, said filter comprising a revolvable screen and means associated with the screen to remove solid particles therefrom and discharge them outside the tank, a collection chamber for heavy solids below said filter, a vibratory means in said chamber, a valved outlet in the bottom of said chamber, said tank including a compartment above the sludge inlet in which particles of less weight than the water accumulate, and discharge means in communication with said compartment to carry said particles away from said compartment, said discharge means having an inlet, a rotary valve element in said conduit normally closing said inlet, means to rotate said valve element, and an auger associated with the valve element to urge material entering said conduit along said conduit.

* * * * *